United States Patent

[11] 3,577,919

[72] Inventor Alexander J. Usko
 Wrapping, Conn.
[21] Appl. No. 807,013
[22] Filed Mar. 13, 1969
[45] Patented May 11, 1971
[73] Assignee Mensanto Company
 St. Louis, Mo.

[54] METHOD AND APPARATUS FOR POSITIONING ARTICLES
 13 Claims, 3 Drawing Figs.
[52] U.S. Cl. .................................................. 101/426,
 101/35, 198/19, 198/33
[51] Int. Cl. .................................................. B23q 5/22,
 B65g 47/24
[50] Field of Search........................................ 198/19, 33
 (R4), 27, 103; 214/1 (R); 156/567; 101/35, 37,
 40, 44; 141/168, 171

[56] References Cited
UNITED STATES PATENTS
| | | | |
|---|---|---|---|
| 1,613,552 | 1/1927 | Armstrong.................. | 198/26 |
| 1,875,532 | 9/1932 | Washburne .................. | 198/27X |
| 2,344,461 | 3/1944 | Hermani....................... | 198/33(R4) |
| 3,100,562 | 8/1963 | Whelan........................ | 198/33(R4) |

Primary Examiner—Edward A. Sroka
Attorneys—James C. Logomasini and Michael J. Murphy ABSTRACT: A method of handling elongated articles such as plastic bottles being transported to and from a vertically oriented work station, which involves transporting the articles on their sides, pivoting each article upright at the work station and striking each article in a controlled manner on leaving the work station to return it to its side. Apparatus includes a pivotally mounted loading device, a reciprocally mounted arm at the discharge of the work station for knocking the bottom of each article onto a conveyor and a bumper adjacent the arm to prevent the upper article portion from moving in the same direction as the arm when the article is contacted thereby.

Patented May 11, 1971

INVENTOR.
ALEXANDER J. USKO
BY
Michael J. Murphy
ATTORNEY:

Patented May 11, 1971

INVENTOR.
ALEXANDER J. USKO
BY Michael J. Murphy
ATTORNEY:

METHOD AND APPARATUS FOR POSITIONING ARTICLES

BACKGROUND OF THE INVENTION

This invention relates to the positioning of articles and in particular to a method and apparatus for feeding articles to, and discharging articles from a processing station.

Work is frequently performed on articles such as elongated, lightweight plastic bottles, in a vertically disposed processing station. Such work may include, e.g., surface treating to improve adhesion, coating, trimming excess plastic after forming, application of indicia, labeling, filling, etc. The articles in such cases are usually fed from a storage hopper through an unscrambling mechanism which deposits the articles one by one on a conveyor for transportation to the processing station. Since the process or work station is vertically oriented, the articles are usually placed in an upright position on the conveyor, or else an apparatus for this is provided in conjunction with the unscrambler. A typical type of vertically disposed work station is that encompassed by U.S. Pat. No. 3,064,714 wherein there is shown a horizontal indexing table having a vertical turret and a series of vertically oriented pockets therein in which the articles are received prior to applying decorative matter to the article surfaces.

A major problem with systems of this type when handling lightweight elongated containers, such as bottles, is the tendency of such a container, which has a rather limited surface supported on a moving conveyor, to topple over on its side. This, of course, commences a chain reaction resulting in the toppling of large numbers of abutting containers causing jams, and requiring repeated shutdowns of a continuous system while an operator laboriously upends each toppled container. The problem is especially acute at the inlet to and discharge from the processing station where the light containers usually undergo a change in direction and in so doing are especially susceptible to falling. The problem is compounded when the articles are noncylindrical and require passage through another station to process a second side. Such systems have been known to function at less than 50 percent efficiency resulting in objectionable expenditures of time and labor which adversely affect the economics of an installation. Guide rails having wear susceptible antifriction tape thereon, clamps, springs, etc. have been used along the path of travel of the articles, but these complicate the system and have, in general, been inadequate in solving the problem. Reorientation or revision of the equipment at the processing station is extremely costly since this apparatus is usually rather substantial in size and delicate and sensitive in operation.

BRIEF SUMMARY OF THE INVENTION

Now there has been developed a new system for handling articles which overcomes the prior art difficulties mentioned above.

Accordingly, it is an object of this invention to provide a method and apparatus for handling articles which is simple and economical in construction and practical and reliable in operation.

Another object of this invention is to provide a method and apparatus for feeding elongated articles to and discharging such articles from a work station.

A further object of this invention is to provide a method and apparatus for handling lightweight, elongated plastic bottles which eliminates the need for elaborate stabilizing equipment to support the bottles during transportation to and from a work station.

Another object of this invention is to provide an improved method and apparatus for handling elongated articles being processed in a vertically disposed work station which can be readily incorporated into an existing facility without requiring changes in the equipment at the work station.

An additional object of this invention is to provide an improved method and apparatus for handling elongated, noncylindrical containers which minimizes the pivoted movement required of each container in preparing each of two opposing sides of the container for decoration in successive work stations.

Other objects of this invention will in part be obvious and will in part appear hereinafter.

These and other objects are accomplished by providing a method of handling elongated articles comprising transporting such articles resting on their sides to a processing station; pivoting the articles to an upright position in the processing station; acting on the upright articles in the processing station; striking the upright articles in a controlled manner after being acted on in the processing station to capsize the articles and return them to their sides; an transporting the capsized articles away from the processing station.

Apparatus is provided which includes a first conveyor for transporting elongated articles on their sides to a processing station; a pivotally mounted loading device adapted to receive successive, individual side-oriented articles from the first conveyor and to flip the article to an upright position in the processing station; a second conveyor for transporting articles on their sides away from the processing station; a reciprocally mounted arm adapted to knock the lower portion of each upright article onto the second conveyor after being acted on in the processing station; and a bumper adjacent the arm to prevent the upper portion of each upright article from moving in the same direction as the arm when the article is contacted by the arm, whereby the upper portion of each article falls by gravity onto the second conveyor resulting in each upended article being in a side-oriented position on the second conveyor.

In a preferred form of the invention, the articles are plastic bottles and the apparatus includes a fixed article guide over the loading device having a curved configuration substantially corresponding to the path traversed by the upper end of an article during upending thereof. A pivotally mounted escapement may be provided adjacent the loading device to meter successive articles from the surface of the first conveyor onto the loading device.

When the articles are noncylindrical and have a plurality of sides on which work is to be performed in successive processing stations, the articles are placed on their sides on leaving the first station in such a manner that on being upended in the second station, the next side to be worked on is already properly oriented and requires no further positioning movement of the article about its axes.

BRIEF DESCRIPTION OF THE DRAWINGS

In describing the overall invention, reference will be made to the accompanying drawings in which.

DESCRIPTION OF PREFERRED EMBODIMENT

Figure 1:
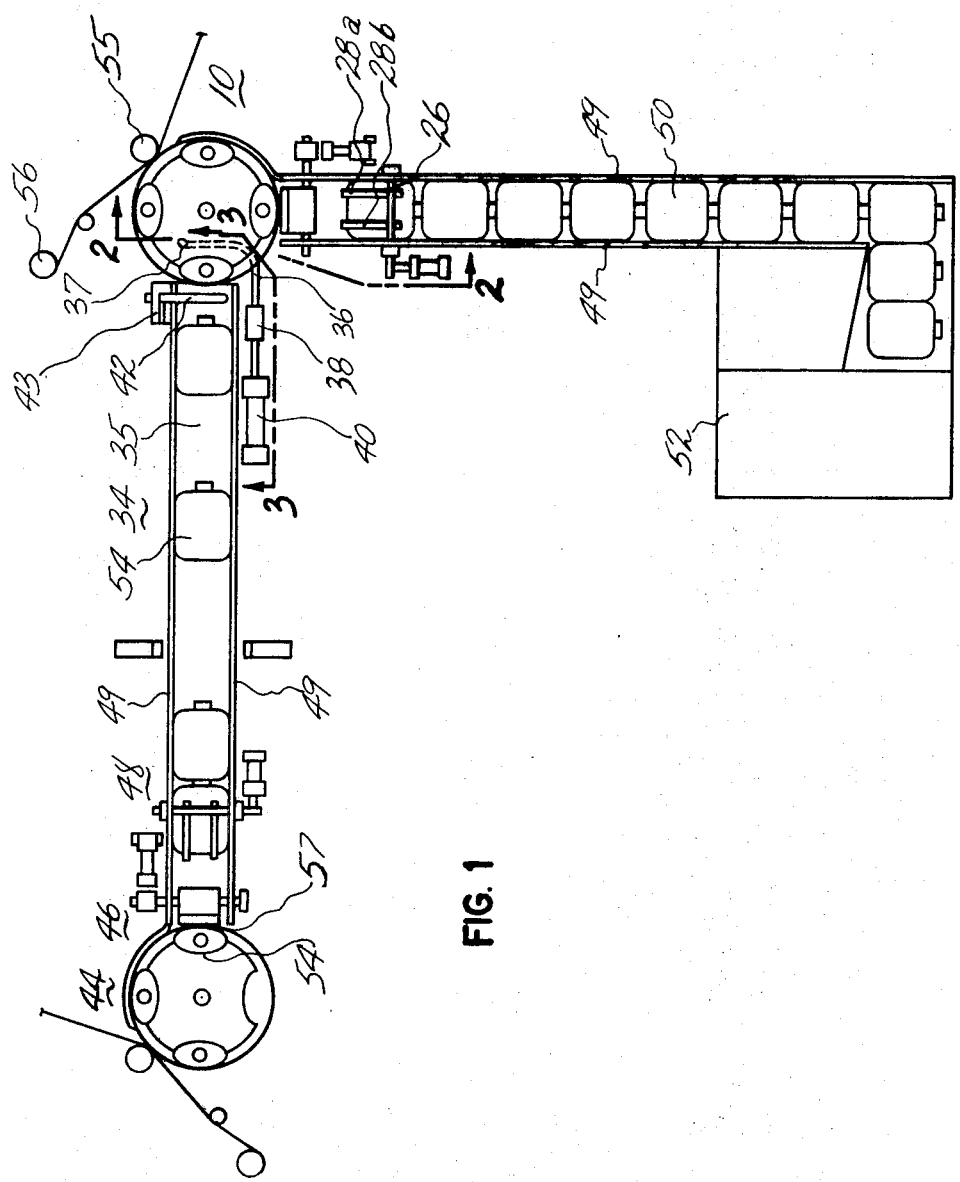
FIG. 1 is a plan view of the apparatus of the invention.

Referring now to the drawings wherein identical numerals refer to identical parts, there is shown in FIG. 1, apparatus for upending elongated bottles, bottom end down, at a vertically oriented processing station 10, and for placing the bottles on their sides after being acted on in processing station 10. This apparatus includes (FIG. 2) a first horizontally disposed endless supply belt conveyor 12 having a discharge end adjacent processing station 10. Conveyor 12 is driven by conventional means such as roller 13 so that belt 15 moves counterclockwise, i.e., adapted to deposit articles at processing station 10. Between the discharge end of conveyor 12 and processing station 10 is a pivotally mounted loading device 14 comprising an open-ended platform 16 connected by a conventional linkage 18 to the shaft of piston operator 20 which is mounted on fixed support 22. Platform 16, however, could have one more sides extending outwardly therefrom. Positioned adjacent loading device 14 is a pivotally mounted escapement 25 comprising (FIG. 1) a shaft 26 having dual spaced arms 28a and 28b fixedly mounted thereon. Shaft 26 is connected by a conventional linkage 29 (FIG. 2) to the shaft of a conventional pneumatic piston operator 30 mounted adjacent operator 20 on support 22. An article guide 32 having a curved configuration is fixedly attached to a turret portion of the apparatus in processing station 10 such that it is positioned above platform 16 of loading device 14.

Figure 3:
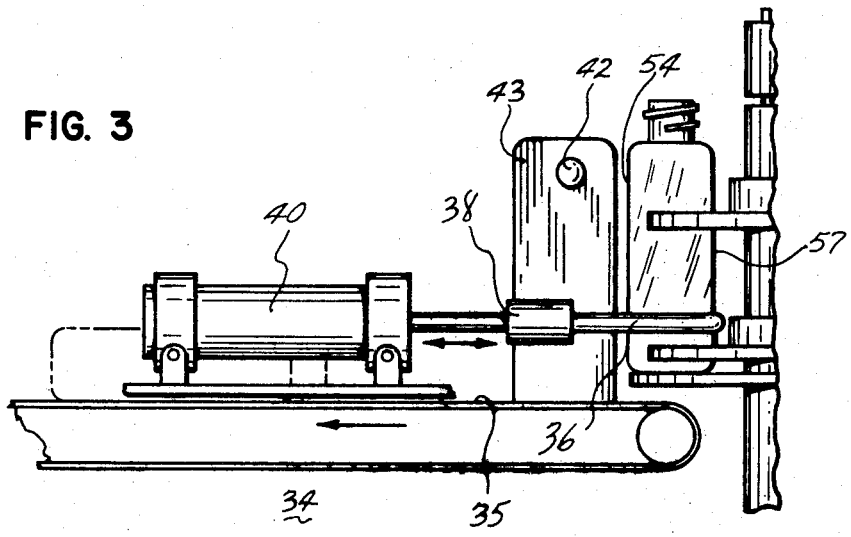
FIG. 3 is a view similar to FIG. 2 taken along the line 3—3 of FIG. 1.

Turning now to FIG. 3, there is shown a second horizontally disposed endless belt conveyor 34, having an article supporting surface 35 for transporting articles away from processing station 10. Mounted in a plane above and substantially parallel to the belt of second conveyor 34 is a horizontally reciprocal L-shaped arm 36. Arm 36 is coupled at 38 to the shaft of pneumatic piston operator 40 which conventionally imparts reciprocal movement to arm 36. Situated adjacent to and above arm 36 is a stationary bumper 42 on support 43. Conventional means well known to those in the art are likewise provided to rotate second conveyor 34 in a direction so as to feed a second processing station 44 by means of an additional loading device 46, guide and escapement 48, each of which is identical to that just described for handling articles in processing station 10.

The apparatus may optionally have article guide rails 49 on either side of first conveyor 12 and/or second conveyor 34 above the surfaces thereof to aid in restraining the articles from falling off. These rails may be adjustable either vertically or laterally by conventional means (not shown) to accommodate different sized articles.

The apparatus shown in processing stations 10 and 44, which is not part of the present invention, represents a typical vertically disposed work station for applying indicia to the side panel of an article such as a plastic bottle. The indicia may be supplied on a rolled paper backing 56 and fed to the application area of the processing station by means, e.g. of conventional rollers 55, where the indicia is applied to the article surface. The apparatus includes a horizontal indexing table 58 having a vertical turret 60 and a series of spaced supports 62 having pockets formed therein to accept an article which is indexed to the application portion of the processing station as table 58 moves in a counterclockwise direction.

Figure 2:
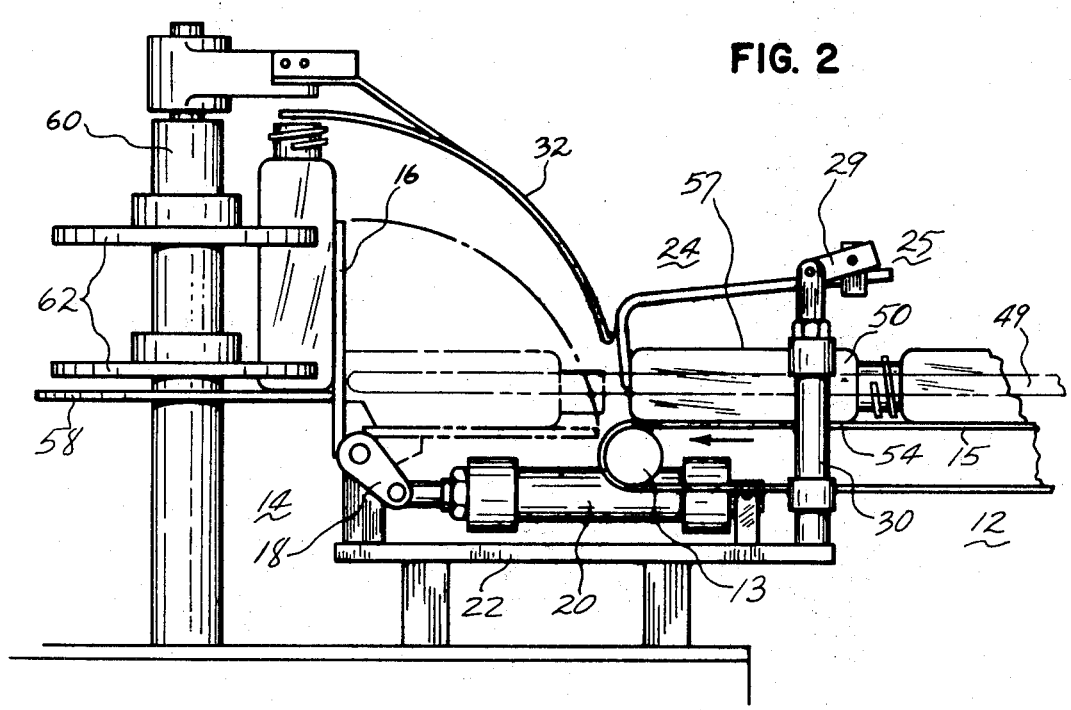
FIG. 2 is a schematic, vertical, sectional view, taken along the line 2—2 of FIG. 1.

In operation, relatively lightweight, elongated articles such as rectangular plastic bottles 50 are fed from a hopper 52 through an unscrambler at the base of the hopper where they are oriented and placed on conveyor 12 on one of two opposing sides, 54 and 57. The bottles are transported by means of conveyor 12 with sides 54 in contact with belt 15, toward processing station 10 and pivotal loading device 14. Transportation is in the side-oriented position so as to avoid the toppling problem occuring when the articles are transported in an upright position. When each container 50 reaches the discharge end of conveyor 12, it is metered onto platform 16 of loading device 14 by escapement 24. That is to say, piston 30 which drives shaft 26 on which arms 28a and 28b are mounted, is connected through a suitable instrument system to conventional indexing means on the apparatus in processing station 10 which is used in moving table 58. When table 58 of this apparatus indexes an empty article pocket opposite loading device 14, piston 30 operates so as to move arms 28a and 28b upwardly, thereby eliminating the barrier to further movement of container 64. Since belt 15 of conveyor 12 (FIG. 2) is moving to the left, container 64 with arms 28 in an up position is thereby pushed off the conveyor onto support 16 of loading device 14. If an indexing as opposed to a continuous conveyor is used, an escapement may not be necessary. Container 50 is still resting on side 54 at this point in the process. Piston 30 then operates immediately to lower arms 28a and 28b thereby reimposing a barrier to further egress of the next container in line from continuously moving conveyor 12. When container 50 is in place on platform 16, piston 20 which is timed by conventional means (not shown) to operate with the indexing means in the processing station, then reciprocates so as to pivot platform 16, 90° upwardly from the horizontal to the vertical with container 50 resting thereon, to thereby flip container 64 into the waiting pocket of the apparatus in the processing station. As can be seen in FIG. 2, side 54 of article 50 is conveniently disposed outwardly in the processing station for receiving indicia thereon. Platform 16 is preferably timed to stay in the up position until the turret starts to move in order to act as a restraint against the bottle toppling out of the pocket as it is being seated therein. After the table begins to move, platform 16 is pivoted downwardly to a horizontal position while table 58 indexes one position counterclockwise so as to orient the next open article pocket above the loading device, whereupon the escapement moves upwardly once more to admit the next article from conveyor 12 to repeat the loading cycle. During upward pivotal movement of container 50 and support 16, fixed guide 32 ensures that the container is not thrown outwardly off platform 16. As can be seen, the curved shape of support 32 substantially corresponds to the path traversed by the upper end of an article during upending by means of loading device 14. If the pivotal movement of platform 16 is slowed sufficiently or the bottles are relatively short, e.g. 4—5 inches or less in height, the articles have been found to seat fairly well on the platform. In such cases guide 32 may not be necessary.

After indicia has been applied on side 54 of article 50 in processing station 10, continuously indexing table 58 positions article 50 opposite the feed end of second conveyor 34 as depicted in FIG. 3. Arm 36, which in its extended position has horizontal branch 37 thereof behind article 50 (FIG. 3), now is caused to reciprocate away from processing station 10 so as to strike the lower portion of upright bottle 50 to knock it forward onto the belt of second conveyor 34. However, to ensure that bottle 50 is orderly aligned on second conveyor 34, bumper 42 which is positioned opposite the upper portion of upright article 50 prevents the upper portion of the bottle from falling forward when the bottom portion is struck by arm 36. This, of course, results in the top portion of each bottle falling backwardly by gravity as the lower portion is knocked forward, thus returning each upended bottle to a side-oriented position once more for transportation away from processing station 10. Therefore, the only time that a bottle is in an upright position is while supported in work station 10. During transportation to and away from work station 10 all bottles are in a stable, side-oriented position on the surface of the conveyors. When the bottles being worked on are noncylindrical, as in the present drawings, it may be necessary to perform additional work on side 57 which is opposite side 54 which was acted on in station 10. If indicia is to be applied to side 57, for example, by means of the equipment in work station 44, second conveyor 34 deposits each successive container 50 on the platform of loading device 46 by means of escapement 48 whereupon it is flipped upright into the pocket of the apparatus in second processing station 44. In so doing, it should be noted that with the apparatus of the present invention, no special reorienting is necessary to have undecorated side 57 properly positioned to be worked on in second processing station 44. This is so because when bottle 50 is returned to its side at the discharge station of the equipment in work station 10, side 54 is facing upwardly and side 57 is in contact with the conveyor surface. This positioning incidentally avoids any smudging of wet indicia which was applied in station 10. However, when article 50 is flipped into position in second station 44, the printed side 54 faces inwardly while the undecorated side 57 faces outwardly and is in position to receive indicia without any further pivotal movement of container 50 about its axes. Containers being discharged from second processing station 44 may be further conveyed to filling stations or further treated by other equipment.

The above description and particularly the drawings are set forth for purposes of illustration only and are not to be taken in a limited sense.

Though two processing stations have been illustrated in the preferred embodiment of the drawings, obviously more than two, or only one station and one set of loading and unloading equipment of the present invention may be necessary. Thus, for example, in processing cylindrical bottles all work may be accomplished on an article at a single station. Though two identical processing stations have been shown, obviously each could be different from the other. The apparatus for upending and returning articles to their sides of the present invention is applicable to any type of vertically disposed apparatus, and, although preferred, is not limited to that for applying indicia to the surfaces of containers. Thus, for example, the processing station may typically be designed for trimming excess plastic from the containers, treating the outer surfaces thereof, coating, filling, etc. Though the system works with any type of elongated article susceptible to toppling because of a relatively small support area, the preferred application is with relatively lightweight thermoplastic containers. The components of the system are simple, inexpensive, reliable and may readily be incorporated into existing installations without revising other work applying apparatus within the installation. An 80—90 percent operating efficiency in terms of throughput is achieved with the system of the present invention.

It will be understood that many variations and modifications of the embodiment herein described will be obvious to those skilled in the art, and may be carried out without departing from the spirit and scope of the invention.

I claim:
1. Apparatus for upending elongated articles, bottom end down, at a processing station and for placing the articles on their sides after being acted on in the processing station, the apparatus comprising:
   a. a first conveyor for transporting elongated articles on their sides to a processing station;
   b. a pivotally mounted loading device adapted to receive successive individual side-oriented articles from the first conveyor and to flip the article to an upright position in the processing station;
   c. a second conveyor for transporting articles on their sides away from the processing station;
   d. a reciprocally mounted arm adapted to knock the lower portion of each upright article onto the second conveyor on leaving the processing station; and
   e. a bumper adjacent the arm to prevent the upper portion of each upright article from moving in the same direction as that of the arm when the article is contacted by the arm, whereby the upper portion of each article falls by gravity onto the second conveyor resulting in each upended article being in a side-oriented position on the second conveyor.

2. The apparatus of claim 1 including a fixed article guide over the loading device having a curved shape substantially corresponding to the path traversed by the upper portion of an article during upending thereof.

3. The apparatus of claim 1 wherein the first conveyor comprises an endless belt, the apparatus including a pivotally mounted escapement adjacent the loading device adapted to meter successive articles from the belt of the first conveyor onto the loading device.

4. Apparatus for upending elongated bottles, bottom end down, at a processing station and for placing the bottles on their sides after being acted on in the processing station, the apparatus comprising:
   a. a first, horizontally disposed supply conveyor having a discharge end;
   b. a movably mounted support adjacent the discharge end of the first conveyor adapted to receive successive individual side-oriented bottles from the first conveyor and to pivot each bottle to an upright position in a processing station;
   c. a bottle guide over the support to assist in keeping the bottle on the support during movement thereof;
   d. a second horizontally disposed conveyor having a bottle supporting surface for transporting bottles away from the processing station;
   e. a horizontally reciprocable arm mounted in a plane above and substantially parallel to the supporting surface of the second conveyor, said arm being adapted to stroke each successive bottle to knock the bottom portion thereof forward onto the second conveyor after being acted on in the processing station; and
   f. a stationary bumper above the arm to prevent the upper portion of each bottle from falling forward when the bottom portion thereof is stroked by the arm, whereby the top portion of each bottle falls backward by gravity onto the second conveyor resulting in each upended bottle having a side-oriented position on the second conveyor.

5. The apparatus of claim 4 wherein the arm is L-shaped with the horizontal branch of the L adapted to contact the bottle during the stroke of the arm.

6. The apparatus of claim 4 wherein the support is an open-ended platform.

7. The apparatus of claim 4 including a pivotally mounted escapement adjacent the support comprising dual spaced arms adapted to move upwardly and downwardly together at predetermined time intervals to meter bottles individually onto the support from the first conveyor.

8. The apparatus of claim 4 including an additional movably mounted support, bottle guide and escapement for upending bottles from the second conveyor at another processing station.

9. The apparatus of claim 4 including adjustable article guide rails extending along the first and second conveyors on either side thereof.

10. A method of handling elongated articles comprising:
    a. transporting elongated articles resting on their sides to a processing station;
    b. pivoting the articles to an upright position in the processing station;
    c. acting on the upright articles in the processing station;
    d. moving an arm forcibly against the lower portion of each upright article after being acted on in the processing station while restraining the upper portion of each article from movement in the same direction to cause the lower portion of each article to move forward and the upper portion to fall backward by gravity onto a moving surface, thereby returning each article to a side-oriented position; and
    e. transporting the thus capsized articles away from the processing station on said moving surface.

11. The method of claim 10 wherein the articles are caused to fall by pulling on the lower portion of each article in a direction away from the processing station while preventing the upper portion thereof from moving in this direction.

12. A method of handling elongated, noncylindrical articles having at least two opposing sides, said method comprising:
    a. transporting elongated, noncylindrical articles resting on one of two opposed sides to a first processing station;
    b. pivoting the articles to an upright position in the first processing station such that said one of the two opposed sides is disposed to be conveniently acted on in the processing station;
    c. acting upon said one of the two opposed sides in the first processing station;
    d. striking the upright articles in a controlled manner after said one of the two opposed sides has been acted on in the first processing station to capsize the articles such that they return to a side-oriented position resting on the other of the two opposed sides;
    e. transporting the capsized articles to a second processing station;
    f. pivoting the articles to an upright position in the second processing station such that said other of the two opposed sides is disposed to be conveniently acted on in the second processing station; and
    g. transporting the articles away from the second processing station after said other of the two opposing sides has been acted on therein.

13. The method of claim 12 wherein indicia is applied to the sides of the articles in the processing stations.